United States Patent [19]

Wallach et al.

[11] Patent Number: 4,532,590
[45] Date of Patent: Jul. 30, 1985

[54] DATA PROCESSING SYSTEM HAVING A UNIQUE ADDRESS TRANSLATION UNIT

[75] Inventors: Steven Wallach, Framingham; Kenneth D. Holberger, N. Grafton; Steven M. Staudaner, Northboro, all of Mass.; Carl Henry, Houston, Tex.

[73] Assignee: Data General Corporation, Westboro, Mass.

[21] Appl. No.: 451,899

[22] Filed: Dec. 21, 1982

Related U.S. Application Data

[63] Continuation of Ser. No. 143,681, Apr. 25, 1980, abandoned.

[51] Int. Cl.³ ............................................... G06F 9/32
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,522,589 | 8/1970 | Thron et al. | 364/200 |
| 3,735,355 | 5/1973 | Balogh, Jr. et al. | 364/200 |
| 4,057,848 | 11/1977 | Hayashi | 364/200 |
| 4,206,503 | 6/1980 | Woods et al. | 364/200 |
| 4,241,399 | 12/1980 | Strecker et al. | 364/200 |

*Primary Examiner*—Thomas M. Heckler
*Attorney, Agent, or Firm*—Robert O'Connell

[57] ABSTRACT

A data processing system which handles thirty-two bit logical addresses which can be derived from either sixteen bit logical addresses or thirty-two bit logical addresses, the latter being translated into physical addresses by unique translation means. The system includes means for decoding macro-instructions of both a basic and an extended instruction set, each macro-instruction containing in itself selected bit patterns which uniquely identify which type of instruction is to be decoded. The decoded macro-instructions provide the starting address of one or more micro-instructions, which address is supplied to a unique micro-instruction sequencing unit which appropriately decodes a selected field of each micro-instruction to obtain each successive micro-instruction. The system uses hierarchical memory storage using eight storage segments (rings), access to the rings being controlled in a privileged manner according to different levels of privilege. The memory system uses a bank of main memory modules which interface with the central processor system via a dual port cache memory, block data transfers between the main memory and the cache memory being controlled by a bank controller unit.

16 Claims, 1 Drawing Figure

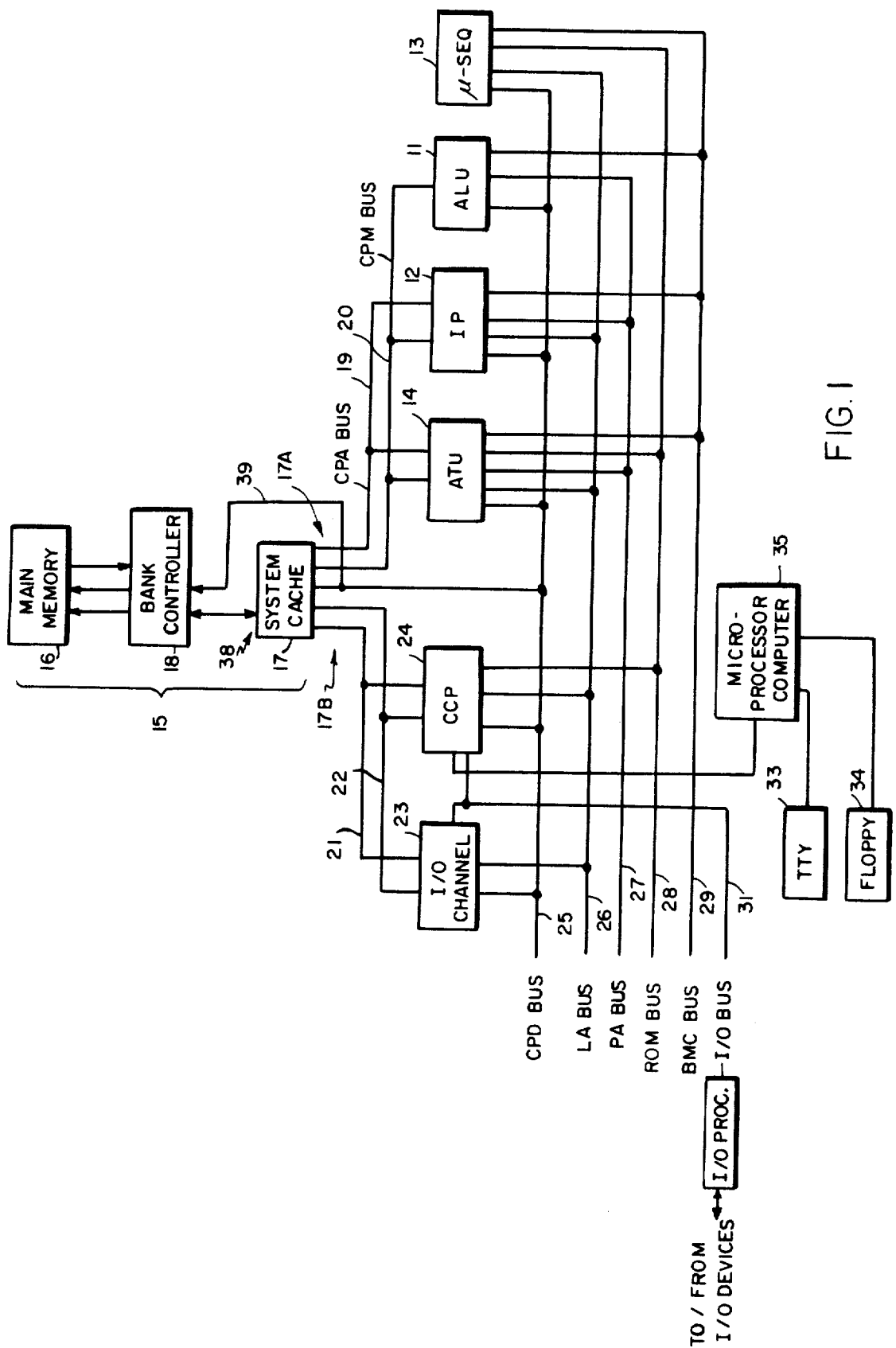

DATA PROCESSING SYSTEM HAVING A UNIQUE ADDRESS TRANSLATION UNIT

This application is a continuation of application Ser. No. 143,681, filed Apr. 25, 1980, abandoned.

INTRODUCTION

This invention relates generally to data processing systems and, more particularly, to such systems which can handle 32 bit logical addresses at a size and cost which is not significantly greater than that of systems which presently handle only 16 bit logical addresses.

RELATED APPLICATIONS

This application is one of the following groups of applications, all of which include the same text and drawings which described an overall data processing system and each of which includes claims directed to a selected aspect of the overall data processing system, as indicated generally by the titles thereof as set forth below. All of such applications are being filed concurrently and, hence, all will have the same filing date.
(1) Data Processing System, Ser. No. 143,561, filed by E. Rasala, S. Wallach, C. Alsing, K. Holberger, C. Holland, T. West, J. Guter, R. Coyle, M. Ziegler and M. Druke, now U.S. Pat. No. 4,386,399;
(2) Data Processing System Having A Unique Address Translation Unit, Ser. No. 143,681, filed by S. Wallach, K. Holberger, S. Staudener and C. Henry, abandoned;
(3) Data Processing System Utilizing A Hierarchical Memory Storage System, Ser. No. 143,981, filed by S. Wallach, K. Holberger, D. Keating and S. Staudener, now U.S. Pat. No. 4,409,655;
(4) Data Processing System Having A Unique Memory System, Ser. No. 143,974, filed by M. Ziegler and M. Druke;
(5) Data Processing System Having A Unique Instruction Processor System, Ser. No. 143,651, filed by K. Holberger, J. Veres, M. Ziegler and C. Henry, now U.S. Pat. No. 4,398,243;
(6) Data Processing System Having A Unique Microsequencing System, Ser. No. 143,710, filed by C. Holland, K. Holberger, D. Epstein, P. Reilly and J. Rosen;
(7) Data Processing System Having Unique Instruction Responsive Means, Ser. No. 143,982, filed by C. Holland, S. Wallach and C. Alsing, now U.S. Pat. No. 4,434,459.

BACKGROUND OF THE INVENTION

Presently available data processing systems which are often referred to as belonging to the "mini-computer" class normally handle logical addresses and data words which are 16 bits in length. As used herein, the term "logical" address, sometimes referred to by those in the art as a "virtual" address, is used to denote an address that is programmer visible, an address which the programmer can manipulate. In contrast, a "physical" address is the address of a datum location in the main memory of a data processing system. Operating data processing systems utilize appropriate translation tables for converting logical addresses to physical addresses.

Such mini-computers have been successfully used in many applications and provide a high degree of data processing capability at reasonable cost. Examples of such systems which have found favor in the marketplace are those known as the "Nova" and the "Eclipse" systems designed and developed by Data General Corporation of Westboro, MA. The Nova and Eclipse family of mini-computers are described in the publications available from Data General Corporation which are listed in Appendix A incorporated as part of this specification.

The Nova system provides a logical address space of 64 kilobytes (the prefix "kilo" more accurately represents 1024, or $2^{10}$) and the Eclipse system also provides a logical address space of 64 kilobytes, both being proven systems for handling many applications at reasonable cost. It is desirable in the development of improved systems to provide for an orderly growth to an even larger logical address space than presently available in Nova and Eclipse systems. Such an extended logical address base permits a larger set of instructions to be utilized by the system, the enlarged instruction set being capable of including substantially all of the basic instructions now presently available in the prior Nova and Eclipse systems as well as a large number of additional, or extended, instructions which take advantage of the increased or expanded logical address space.

Accordingly, such an improved system should be designed to be responsive to software which has been previously designed for use in Nova and Eclipse systems so that those presently having a library of Nova and Eclipse software, representing a substantial investment, can still use such software in the improved, expanded address system. The improved system also would provide for a greater flexibility in performance at a reasonable cost so as to permit more on-line users at a larger number of on-line terminals to utilize the system. The expanded address space would further permit the system to support more extensive and sophisticated programs devised specifically therefor, as well as to support all of the previous programs supported by the unextended Nova or Eclipse systems.

BRIEF SUMMARY OF THE INVENTION

The system of the invention utilizes a unique combination of central processor and memory units, the processor comprising an address translation unit, an instruction processor unit, an arithmetic logic unit and a microsequencing unit, while the memory unit includes a system cache unit, a main memory unit and a bank controller unit for controlling data transfers therebetween. The system handles thirty-two bit logical addresses which can be derived from either sixteen bit or thirty-two bit addresses. unique means are provided for translating the thirty-two bit logical addresses. The system uses hierarchical memory storage, wherein information is stored in different segment storage regions (rings), access to the rings being controlled in a privileged manner so that access to different rings are governed by different levels of privilege.

The memory system uses a main memory comprising a plurality of memory modules each having a plurality of memory planes. The main memory normally interfaces with the remainder of the system via a dual port system cache memory unit, block data transfers between the main memory and the system cache are controlled by a bank controller unit.

Macro-instructions are decoded using a unique programmable read-only-memory means which is capable of decoding instructions of two types, i.e., instructions from a first basic instruction set or instructions from a second extended instruction set, the instruction which is being decoded containing in itself selected bit patterns which uniquely identify whch type of instruction is to be decoded.

The decoded instructions provide the starting address of one or more microinstructions, which starting address is supplied to a unique microinstruction sequencing unit which appropriately decodes a selected field of each microinstruction for determining the address of the next successive microinstruction, such address being suitably selected from a plurality of microaddress sources.

The overall system includes means responding to certain macro-instructions which perform unique operations indigenous to the overall system.

DESCRIPTION OF THE INVENTION

The invention can be described in more detail with the help of the drawings wherein:

FIG. 1 shows a block diagram of the overall data processing system of the invention as described therein.

This application incorporates by reference the entire application, Ser. No. 143,982, filed on Apr. 25, 1980, of Charles J. Holland et al., now issued as U.S. Pat. No. 4,434,459, dated Feb. 24, 1984.

What is claimed is:

1. In a data processing system which operates in first and second operating modes, said system responding in said first operating mode to first logical addresses containing a first number of address bits and responding in said second operating mode to second logical addresses containing a second number of address bits, said system comprising:

memory means responding to physical addresses containing said second number of address bits;

program counter means for providing logical addresses for accessing a sequence of instruction words a first plurality of said instruction words, during said first operating mode, being accessed from said memory using said first logical addresses and a second plurality of said instruction words, during said second operating mode, being accessed from said memory means using said second logical addresses;

decode means, responsive to instruction words obtained from said memory means, for decoding said instruction words, the decoding thereof producing address descriptor bits, one or more selected ones of said address descriptor bits signifying whether first or second logical addresses are to be used for accessing a subsequent instruction word;

means connected to said decode means and responsive to said address descriptor bits when said first logical addresses from said program counter means are so signified for converting said first logical addresses into logical addresses containing said second number of address bits; and means responsive either to said converted logical addresses from said program counter means for translating said converted logical addresses or said second logical addresses into physical addresses containing said second number of address bits for supply to said memory means.

2. A system in accordance with claim 1 wherein said first logical addreses have fewer bits than said second logical addresses.

3. A system in accordance with claim 2 wherein said first logical addresses are logical word addresses which have fifteen bits and said second logical addresses are logical word addresses which have thirty-one bits.

4. A system in accordance with claim 2 wherein said first logical addresses are logical byte addresses which have sixteen bits and said second logical addresses are logical byte addresses which have thirty-two bits.

5. A system in accordance with claim 1 wherein said decode means comprises programmable read-only-memory means.

6. A system in accordance with claim 5 wherein said programmable read-only-memory means includes a first logic means responsive to one or more selected bits of said instruction words for decoding only instruction words used during said first operating mode; and a second logic means responsive to said one or more selected bits of said instruction words for decoding only instruction words used during said second operating mode, said first and second logic means being arranged to operate simultaneously in response to said instruction words for decoding said first plurality of instruction words and said second plurality of instruction words on a non-mutually exclusive basis.

7. A system in accordance with claim 6 wherein said means for translating includes translation storage means capable of storing first memory allocation data for determining physical addresses in response to said converted first logical addresses and further capable of storing second memory allocation data for determining physical addresses in response to either said converted first logical addresses or said second logical addresses;

means for selectively supplying said first memory allocation data or said second memory allocation data to said translation storage means, said selectively stored memory allocation data responding to corresponding converted first logical addresses or second logical addresses to produce said physical addresses.

8. A system in accordance with claim 7 and further including means responsive to at least one bit of said converted first logical addresses or said second logical addresses for identifying whether the address to which said translation storage means responds is a first logical address or a second logical address.

9. A system in accordance with claim 7 and further including means for determining whether said first memory allocation data or said second memory allocation data is to be used to produce said physical addresses.

10. A system in accordance with claim 7 wherein logical addresses to be used in said system are grouped in blocks thereof, each logical address including a plurality of tag bits for identifying in which block the logical address belongs and said translation storage means stores selected memory allocation data for use in translating selected blocks of logical addresses into physical addresses, said system further including tag storage means for storing the tag bits of the selected blocks of logical addresses which correspond to the memory allocation data stored in said translation storage means; and means for comparing the tag bits of logical addresses stored in said tag storage means with the tag bits of an input logical address to be supplied to said translation storage means for translation thereof into a physical address for identifying whether said input logical address corresponds to a logical address of one of said selected blocks thereof.

11. A system in accordance with claim 10 wherein said system includes memory means for storing a plurality of page tables each of which contain memory allocation data for use in translating one or more selected blocks of logical addresses;

said system further including means responsive to an indication from said comparing means that the memory allocation data for translating said input logical address is not available in said translation storage means for accessing new memory allocation data capable of translating said input logical address from said page tables in said memory means; and means for replacing memory allocation data currently stored in said translation storage means with said new accessed memory allocation data.

12. A system in accordance with claim 11 and further including means for indicating a page table fault if the page table required to be accessed from said memory means is not resident therein.

13. A system in accordance with claim 11 wherein the memory allocation data to be accessed from a page table in said memory means can be accessed directly as a one-level page table access or can be accessed indirectly via an intermediate page table as a two-level page table access; and further including means for determining whether said accessing is a one-level page table access or a two-level page table access.

14. A system in accordance with claim 13 wherein said system includes means for providing a one-level page table access in response to an input logical address, said means comprising means responsive to a selected field of said input logical address for obtaining a first address identifying the starting address of a selected page table in said memory means;

means responsive to another selected field of said input logical address representing a selected offset from the starting address of said selected page table to provide a page table entry address at said offset; and means for extracting a selected field of said page table entry address requesting the memory allocation data for said input logical address and for placing said memory allocation data in said translation storage means.

15. A system in accordance with claim 11 wherein said system includes means for providing a two-level page table access in response to an input logical address, said means comprising means responsive to a selected field of said input logical address for obtaining a first address identifying the starting address of a first selected page table in said memory means;

means responsive to another selected field of said input logical address representing a first selected offset from the starting address of said first selected page table to provide a first page table entry address at said first offset;

means responsive to a selected field of said first page table entry address for obtaining a second address identifying the starting address of a second selected page table in said memory means;

means responsive to still another field of said input logical address representing a second selected offset from the starting address of said second selected page table to provide a second page table entry address at said second offset; and means for extracting a selected field of said second page table entry address representing the memory allocation data for said input logical address and for placing said memory allocation data in said translation storage means.

16. A system in accordance with claim 13 wherein the bits of a further selected field of said input logical address are all zero when a one-level page table access is required for said input logical address; and means for indicating a further page table fault when said one-level or two-level page table determining means determines that said page table access is a one-level access and said further selected field of said input logical address includes one or more non-zero bits.

* * * * *